United States Patent [19]
Steever et al.

[11] 3,983,927
[45] Oct. 5, 1976

[54] HEAT EXCHANGER FOR FLUIDIZED BED REACTOR

[75] Inventors: Andrew Beaumont Steever, Old Greenwich; Walfred Wilhelm Jukkola, Westport, both of Conn.

[73] Assignee: Dorr-Oliver Incorporated, Stamford, Conn.

[22] Filed: June 25, 1975

[21] Appl. No.: 590,331

[52] U.S. Cl. .............................. 165/1; 165/104 F; 122/4 D; 23/288 S; 165/134
[51] Int. Cl.² ............................................ F28D 13/00
[58] Field of Search ............... 165/104 F, 1, 134; 122/4 D; 23/288 S

[56] References Cited
UNITED STATES PATENTS

| | | | |
|---|---|---|---|
| 2,580,827 | 1/1952 | Payne | 23/288 S |
| 2,585,274 | 2/1952 | Reichl | 165/104 F X |
| 2,852,545 | 9/1958 | Jenny | 165/104 F X |
| 3,679,373 | 7/1972 | Van Camp et al. | 165/104 F X |
| 3,898,043 | 8/1975 | Schutte et al. | 165/104 F X |

Primary Examiner—Albert W. Davis, Jr.
Attorney, Agent, or Firm—H. M. Snyder; Burtsell J. Kearns; Theodore M. Jablon

[57] ABSTRACT

A fluidized bed reactor is provided with vertically oriented heat exchange coils for controlling the temperature of the fluidized bed. Tuyere elements discharge fluidizing gas at a level substantially above the constriction plate. The bed solids below the level of the tuyere ports constitute a static layer during fluidization and the lower return bends of the heat exchange coils are embedded in this layer and so are shielded from erosion by the fluidized solids of the bed proper.

8 Claims, 4 Drawing Figures

U.S. Patent  Oct. 5, 1976  3,983,927
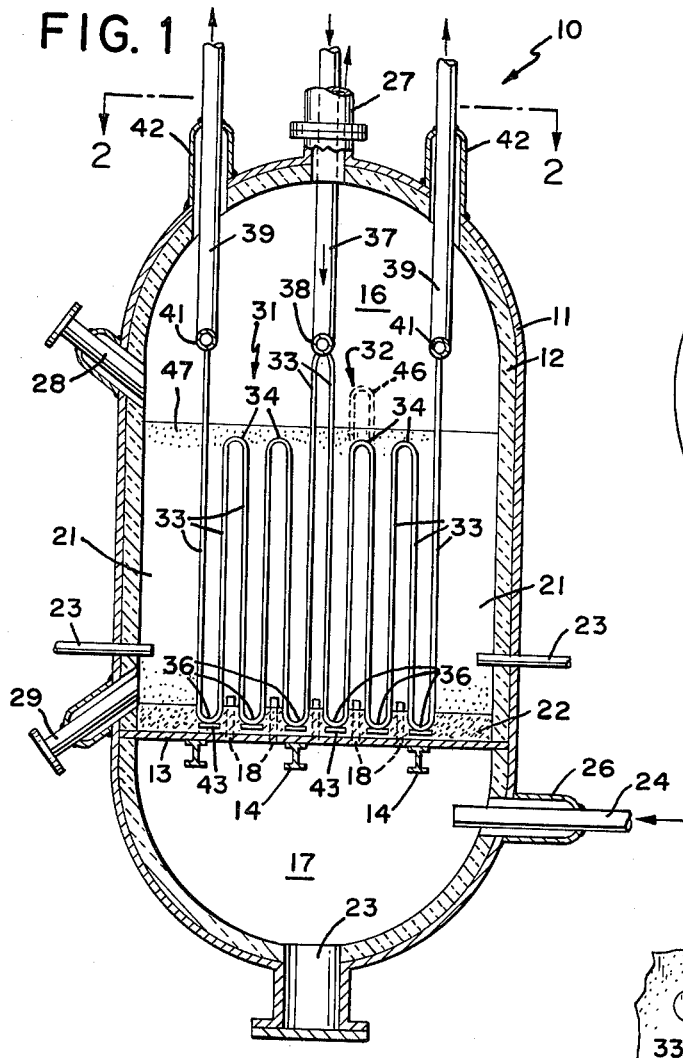
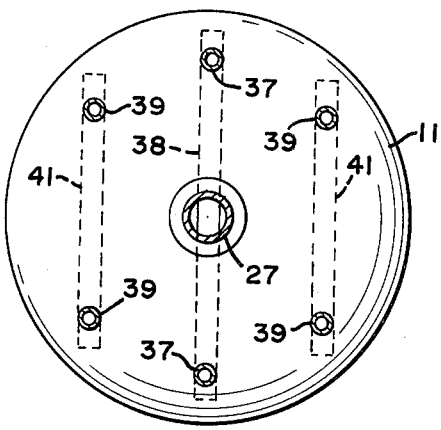
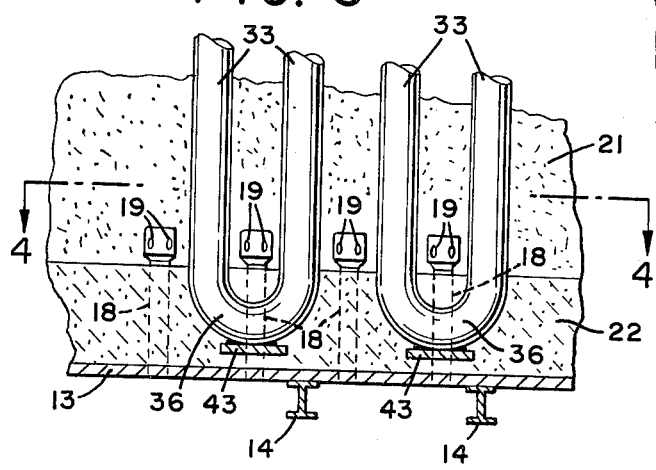

HEAT EXCHANGER FOR FLUIDIZED BED REACTOR

This invention is directed to a novel arrangement for a heat exchanger structure provided to control the operating temperature of the fluidized bed of particulate solids in a fluid bed reactor.

Fluidized bed reactors are extremely versatile apparatus, which, in various forms, can carry out the processes of drying, sizing, roasting, calcining, heat treatment of solids with gases in the chemical, metallurgical and other materials processing fields, and the generation of hot gases, including steam, for use in driving electric power generation equipment. When the fluidized bed reactor is employed to carry out exothermic reactions, it is often necessary to prevent excessively high temperatures within the reactor by providing cooling means either within the freeboard volume or within the bed of fluidized solids. The cooling means may take the form of cooling coils through which a process fluid, which may be a gas or a liquid, is circulated to remove the excess heat. The heat removed by the fluid may often be used for heating in other stages of a process or for power generation. Sometimes the cooling coils are located in the walls of the reaction chamber where they are well protected from the often severe erosive conditions within the reactor chamber.

The conditions within the fluidized bed are most severe of all in exothermic reactions because the temperature in the bed is likely to be higher than elsewhere in the reactor and the violent agitation and relatively high concentration of particulate solids lead to the most erosive conditions to be found in the reactor. It has been customary to orient in-bed heat exchanger coils horizontally, with coils of hairpin configuration serially joined. Horizontal coil configurations of this type are to be seen in British Pat. No. 895,791, published May 9, 1962, U.S. Pat. No. 2,789,034 to J. W. Swaine et al., issued Apr. 16, 1957, and in U.S. Pat. No. 2,825,628 to A. Johannsen et al., issued Mar. 4, 1958. In general, horizontal configurations are best where only a modest amount of heat exchange surface area is required because the horizontal coils have a relatively simple mode of entry and support through the side of the reactor. Vertical orientation of the coils either clutters the freeboard region with headers and support structure or complicates the structure associated with the constriction plate.

In pressurized heat exchangers are fluidized bed tends to be rather compact due to the elevated pressure. This compact bed permits a reduction in size of the reaction chamber and gives rise to a high heat transfer rate from the solids of the bed to the heat exchange coils. However, in order to take advantage of these virtues of the pressurized fluid bed heat exchanger, it is necessary to have a high concentration of coils within the fluidized bed. Furthermore, in order to achieve adequate mass flow rate within the coils so that the desired heat transfer rate to the cooling medium is attained, and for other reasons such as eliminating steam hammering, it has been found necessary to have many coils connected in series.

Horizontal coils are subject to abrasion which is many times greater than the experienced by vertically oriented coils. Such exposure to abrasion has a drastic effect on the life expectancy of horizontal coils and, under the same service conditions, vertical coils will have a life expectancy of at least three to five times that of horizontal coils. In the case of vertically oriented coils the return bends, which serially connect the vertical runs of tubing, are subject to the greatest abrasion due to the local turbulence created by the bends which, of course, have a horizontal orientation aspect.

A novel arrangement of heat exchanger coils within a fluid bed reactor has now been provided wherein the heat exchanger coils are vertically oriented, with the lower return bends thereof protected from erosion in the bed and with means on said lower return bends for retaining the coils in position.

It is an object of the invention to provide an improved heat exchanger structural arrangement within the fluidized bed of a fluidized bed reactor.

It is a further object of this invention to provide a vertically oriented heat exchanger for operation within the fluidized bed of a fluidized bed reactor wherein the bottom return bends of the heat exchanger are protected from the highly erosive conditions within the fluidized bed.

Other objects and advantages will become apparent from the following description taken in conjunction with the accompanying drawings in which:

FIG. 1 is a view partially in section of a fluidized bed reactor incorporating vertically oriented heat exchanger coils in accordance with this invention, FIG. 2 is a plan view of the reactor taken along line 2—2 of FIG. 1, FIG. 3 is an enlarged view of the lower ends of the coil assembly and tuyeres, and FIG. 4 is a plan view of the lower end of the cooling coil assembly and tuyeres taken along line 4—4 of FIG. 3.

Generally speaking, the heat exchanger coil assembly of the present invention comprises a plurality of vertically oriented coils or platens in which the lower return bends of the coils are protected from the erosive conditions within the reactor by bed material and said lower return bends have positioning means secured thereto which cooperate with tuyeres fixed to said constriction plate and extending into the fluid bed reaction chamber.

More specifically, the lower return bends of the heat exchanger coils are covered by a layer of quiescent or static bed material which protects them from the erosive conditions that prevail in the volume of the reaction chamber occupied by the fluidized solids. The static layer of solids is established on the top surface of the fluid bed constriction plate and extends upwardly to just below the level of the tuyere ports; the tuyeres extending into the reaction chamber a substantial distance. The particulate solids below the level of the tuyere ports are essentially undisturbed by the fluidizing gas issuing through the ports. In this static layer there is little or no movement of gas or solids. The lateral positioning means for the heat exchanger are plates, welded or otherwise secured to each of the bottom return bends, which extend into close proximity with tuyeres adjacent each return bend.

Referring now to the drawings, in FIG. 1 there is shown a fluidized bed reactor 10 which incorporates vertically disposed heat exchanger coils 31 and 32 arranged within reactor 10 in accordance with the present invention. The fluidized bed reactor 10 has a metal outer shell 11 which is lined with a layer of refractory insulation 12. The interior of the reactor 10 is divided into two compartments by the constriction plate 13, with a reaction chamber 16 above the constriction plate 13 and a smaller windbox 17 below the constriction plate 13. A plurality of tuyeres 18, arranged in rows, extend upwardly from the constriction plate 13 into the reaction chamber 16. A series of horizontal steel beams 14 near the top of windbox 17 provide support for the constriction plate 13. A gas inlet conduit 24 is provided for supplying fluidizing gases to the windbox 17, the gases being admitted to the reaction chamber 16 through the tuyeres 18. The gas inlet conduit 24 passes through the wall of the reactor shell through a thermal sleeve 26 which minimizes stresses on the wall of the reactor vessel. The windbox 17 is provided with a cleanout port 23 through which any solid particulate matter which may have accumulated in the windbox may be removed. Conduit 27, having access to the freeboard region of the reaction chamber 16, is provided for the purpose of conducting the off-gases from the reaction chamber 16. A conduit 28 passes through the wall of the reaction chamber for replenishing bed material. One or more fuel guns 23 are peripherally situated about the reactor to deliver fuel into the fluidized bed 21. A discharge conduit 29 is also provided with access to the reaction chamber for removal of excess or spent bed material. On the constriction plate 13 there is provided a body of solid particulate matter 21 which, in response to the gases admitted into the reaction chamber 16 through tuyeres 18, becomes an expanded fluidized bed occupying the reaction chamber to the level indicated at 47. The body of solid particulate material in the reaction chamber is also characterized, in accordance with this invention, by a layer of static solid particulate material 22.

Penetrating through the shell 11 and the refractory lining 12 of the fluidized bed reactor 10 are a pair of inlet conduits 37 and a plurality of outlet conduits 39. All of these conduits are provided with thermal sleeves 42 which tend to minimize any stresses produced on the reactor shell 11. The conduits 37 are connected to an inlet header 38 which is horizontally oriented in the reaction chamber 16 above the level 47 of the fluidized bed 21. Similarly the outlet conduits 39 communicate with horizontally oriented outlet headers 41. The heat exchanger coils are suspended from and communicate between the inlet header 38 and the outlet headers 41. While only two heat exchanger coils 31 and 32 are illustrated in FIG. 1, it will be understood that a large number of such coils can be installed in the reaction chamber 16 and the precise number of such coils will depend upon the number required to achieve the desired temperature in the fluid bed and/or the amount of heated process fluid required. The upper return bends 34 of the heat exchanger platens are seen to be situated within the body of fluidized material 21. As best seen in FIG. 3, the lower return bends 36 of the heat exchanger coils 31 and 32 are located within the layer 22 of static particulate material which rests on the constriction plate 13 and extends upwardly therefrom to a level just below the tuyere ports 19.

In FIG. 3 the arrangement and structure of the lower return bends 36 is more clearly apparent. The centering plates 43 are welded to the very bottom of the return bends 36. Centering plates 43 are not in contact with the constriction plate 13 but are located a slight distance above the constriction plate 13 to allow for expansion of the heat exchanger coils.

Considering FIGS. 3 and 4 together, it will be seen that the centering plates 43 at the bottom of the return bends 36 have a complementary cutout surface 44 which extends closely adjacent to the tuyeres 18 and is shaped to conform therewith. It will be seen, particularly from FIG. 4, that the lower return bends will be maintained by the centering plates 43 in positions lying in planes approximately central and parallel to adjacent rows of tuyeres.

In operation, fuel is introduced through the fuel guns 23. Injection air may also be introduced with the fuel through fuel guns 23 either as a fuel carrier for solid fuels or to improve fuel dispersion where liquid fuel is employed. Fluidizing gases, which may be at an elevated temperature, are introduced through inlet conduit 24. The gas passing through inlet conduit 24 traverses the constriction plate 13 through the tuyeres 18 and issues from the tuyere ports 19 to fluidize the particulate solids within the reaction chamber 16, at least to the extent that the particulate solids are above the level of the tuyere ports 19. Below the level of the tuyere ports 19 is a layer of particulate solids which is static or quiescent and in which the lower return bends 36 of the heat exchanger coils 31 and 32 are embedded. The combustion gases generated in the bed move through the bed to the freeboard space in the reaction chamber 16. From the freeboard space the gases are removed through the gas outlet conduit 27 for further treatment and/or disposal. The process fluid is introduced by means of the process fluid inlet pipe 37 which connects to the inlet header 38. From the inlet header 38 the fluid traverses the heat exchanger coils 31 and 32 to remove the heat from the bed and thereby reach the desired temperature for the process fluid. The hot process fluid is discharged into the outlet headers 41. From the outlet headers 41 the process fluid moves through the outlet pipes 39 from which it is conducted to apparatus (not shown) for recovering heat or for power generation or for other purposes.

The particulate solids in the fluidized bed are in violent motion when the fluidized bed reactor is in operation and, consequently, attrition of the bed particles is a continuing condition. The fines produced in the bed in this way generally leave the reaction chamber with the exhaust gases. For this reason, the particulate solids of the bed must be replenished from time to time and conduit 28, which communicates with the reaction chamber, provides a means for introducing additional particulate solids ihnto the reaction chamber. In the case of some reactions in the bed, the bed solids become spent or exhausted and must be replaced. Conduit 29 provides a means for removing spent bed solids. By adding new particulate solids through conduit 28 as bed material is discharged at another point, the character of the fluidized bed can be stabilized.

In one application of the fluidized bed reactor of this invention, the reactor is employed to burn coal as a fuel and thereby generate hot gases capable of driving a gas turbine which, in turn, drives a generator for the production of electric power. The use of combustion gases from the burning coal for driving gas turbines has the disadvantage that the combustion gases often contain large amounts of sulfur compounds which make the gases highly corrosive when contacting the turbine blades. Further, the discharge of noxious gases containing sulfur compounds into the atmosphere is undesirable from the environmental point of view. The combustion gases also contain substantial amounts of solids which are erosive when they impinge upon the turbine blades. Accordingly, a substantial amount of gas cleaning apparatus must be interposed between the fluidized bed reactor and the gas turbine and traversing this apparatus results in considerable pressure drop and, hence, loss in energy. The apparatus described herein tends to minimize these problems, first, by lowering the sulfur content in the combustion gases, and second, by reducing the dust content of the hot gases. The first objective is attained by proper temperature control in a fluidized bed with appropriate bed solids, while the second objective is realized by using hot dust-free air as one component of the hot gases employed for driving the gas turbine.

For this application, air is admitted through inlet conduit 24 at a temperature of about 650°F. The fluidized bed is composed of limestone or dolomite having an average particle size of up to ⅛ inch diameter or so. Crushed coal is introduced into the fluidized bed through the fuel guns 23. The coal burns in the fluidized bed which reaches a temperature of about 1700°F. The sulfur in the coal tends to react at this temperature with the limestone of the bed and the product of this reaction, $CaSO_4$, remains in the bed (When dolomite is used, some $MgSO_4$ is also formed.) The calcium sulphate thus formed in the fluidized bed may be removed through the discharge conduit 29 while fresh limestone is introduced through the inlet conduit 28. It is of interest to note that the calcium sulphate discharged from the fluidized bed may be reheated in other apparatus (not shown) to drive off the $SO_3$ gas as the initial step in the production of sulphuric acid, while the lime thus produced may be returned to fluid bed reactor 10 for reuse in this process.

The process fluid introduced into inlet conduit 37 is preferably air and, in the course of traversing the heat exchanger coils 31 and 32, reaches a temperature of about 1360°F. This clean, hot air may then be directed to the gas turbine. The combustion gases issuing from gas outlet conduit 27 are substantially free of sulfur and need only have the dust particles removed therefrom before admitting the combustion gases to the gas turbine.

As has been indicated previously, the violent agitation of the particulate matter in the fluidized bed has an extremely erosive effect on the upper return bends of the heat exchanger coils, while the vertical tube runs 33 are less subject to erosion. Accordingly, the upper return bends must either be armored; i.e. formed of tubing having a very heavy wall, or the upper return bends must extend well above and out of the fluidized bed of solids (See the dotted line showing 46 in FIG. 1.) Extending the upper tube bends above the level of the fluidized bed does involve some sacrifice in heat transfer efficiency.

The lower return bends 36, as described above, are embedded in and protected by the static or quiescent layer of particulate solids 22. Since the solid particles in this layer are essentially at rest, and there is substantially no gas flow through this region, which is well below the tuyere ports 19, the lower return bends 36 are subject to little or no erosion. The centering plates 43 which are welded to the lower return bends 36 cooperate with adjacent tuyeres 18 to center the return bends 36 between the tuyeres. As shown in FIG. 3, the centering plate 43 is not in contact with the constriction plate 13 when the heat exchanger coils are cold, but when the coils become hot they will expand and the centering plates 43 will approach the constriction plate 13, forcing the particulate solids aside as the centering plate and lower return bend move downwardly. During movement downward upon expansion, or movement upward when contracting during cooling, the centering plates 43, with their complementary surfaces 44 adjacent the tuyeres, may guide or slide on the tuyeres during such movement and will accordingly maintain the return bends in centered position between the tuyeres.

While horizontally oriented fuel guns have been illustrated, it is also possible and sometimes desirable to have the fuel guns vertically oriented and penetrating the constriction plate through the windbox 17. Thus, a predetermined number of vertically oriented fuel guns could be substituted for certain of the tuyeres 18 illustrated. One type of vertically oriented fuel gun is shown and described in U.S. Pat. No. 3,861,862, which issued Jan. 21, 1975 to the inventors of the present invention.

Air has been indicated as the process fluid of interest in the present case, but it is also possible to employ other heat treatment media, such as water, and even, in some cases, the liquid metal NaK.

The tuyere ports should be oriented in such a manner that no impingement of hot gases will occur on the coils. In general, the tuyere ports will be directed toward each other.

The heat exchanger coils, when freed from the connecting header, can be lifted out without any uncoupling of supports at the bottom A manhole (not shown) may be provided in the reactor shell 11 in the region of the freeboard for withdrawing the coils from the reactor. Maintenance is thus greatly simplified.

A novel arrangement for heat exchanger coils in a fluidized bed reactor has been disclosed which promises improved life for such elements.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

1. A fluidized bed reactor comprising a reaction chamber, a windbox separated from said reaction chamber by a constriction plate, tuyeres mounted in said constriction plate and extending upwardly therefrom into said reaction chamber so as to provide tuyere ports for fluidizing gases at a level substantially above said constriction plate, a body of particulate solids subject to fluidization on said constriction plate, a plurality of heat exchanger coils comprising vertically oriented runs of tubing serially joined by upper and lower return bends, said vertical runs of tubing being located in contact with said body of particulate solids for heat exchange with said solids in the fluidized state, said lower return bends being positioned in a layer of static or quiescent solids located in a region between the upper surface of said constriction plate and the level in the bed at which fluidizing gases are introduced through said tuyere ports, whereby said lower return bends are protected by said static solids layer from the highly erosive conditions which prevail in the region in which solids are in the fluidized state.

2. The fluidized bed reactor of claim 1 wherein said upper return bends are located within said fluidized body of particulate solids and are armored or reinforced to resist erosion.

3. The fluidized bed reactor of claim 1 wherein said vertically oriented runs of tubing extend into a freeboard region above said fluidized body of particulate solids and in said freeboard region, remote from the erosive conditions prevailing in said fluidized body, are serially joined by said upper return bends.

4. The fluidized bed reactor of claim 1 wherein said tuyeres are arranged in rows in said constriction plate with said lower return bends positioned between and in planes parallel to said rows, a centering plate secured to each of said lower return bends, each of said centering plates extending between and into close proximity to a pair of tuyeres in adjacent rows on opposite sides of said lower return bends and contacting surfaces on said centering plate for occasional centering contact with said tuyeres.

5. The fluidized bed reactor of claim 4 wherein said contacting surfaces have a configuration complementary to said tuyeres for sliding contact therewith and wherein armored or thick-walled upper return bends capable of sustaining erosive conditions are located within said fluidized body of particulate solids.

6. The fluidized bed reactor of claim 4 wherein said contacting surfaces have a configuration complementary to said tuyeres for sliding engagement therewith and wherein said vertically oriented runs of tubing extend into a freeboard region above said fluidized body of particulate solids and, in said freeboard region, are serially joined by said upper return bends.

7. In a fluidized bed heat exchanger, a constriction plate, a body of fluidized particulate solids in said heat exchanger, at least one coil of heat exchanger tubes located in said fluidized body, said heat exchanger tubes arranged so that the tube runs are vertically oriented, a body of static or quiescent particulate solids on said constriction plate and below said fluidized body, lower return bends serially joining said heat exchanger tubes, said lower return bends being embedded in said static layer of particulate solids.

8. A method for protecting the lower return bends of vertically oriented heat exchanger coils which are situated within the particulate solids bed of a fluidized bed reactor for temperature control of said bed, said method comprising, injecting fluidizing gas into said particulate solids bed at a level above that at which said lower return bends are located whereby said lower return bends are embedded in a static layer of particulate solids and so shielded from erosion by said fluidized solids.

* * * * *